US011270229B2

(12) United States Patent
Snyder et al.

(10) Patent No.: US 11,270,229 B2
(45) Date of Patent: Mar. 8, 2022

(54) USING MACHINE LEARNING TO PREDICT OUTCOMES FOR DOCUMENTS

(71) Applicant: Textio, Inc., Seattle, WA (US)

(72) Inventors: Kieran Snyder, Seattle, WA (US); Robert E. Kolba, Jr., Seattle, WA (US); Jensen Harris, Seattle, WA (US)

(73) Assignee: Textio, Inc., Seattle, WA (US)

( * ) Notice: Subject to any disclaimer, the term of this patent is extended or adjusted under 35 U.S.C. 154(b) by 30 days.

(21) Appl. No.: 16/794,532

(22) Filed: Feb. 19, 2020

(65) Prior Publication Data

US 2020/0184377 A1 Jun. 11, 2020

Related U.S. Application Data

(63) Continuation of application No. 15/161,151, filed on May 20, 2016, now Pat. No. 10,607,152.
(Continued)

(51) Int. Cl.
| | |
|---|---|
| *G06F 17/28* | (2006.01) |
| *G06F 17/24* | (2006.01) |
| *G06F 17/21* | (2006.01) |
| *G06F 17/30* | (2006.01) |
| *G06Q 30/02* | (2012.01) |
| *G06Q 10/10* | (2012.01) |
| *G06F 15/18* | (2006.01) |
| *G06N 20/00* | (2019.01) |

(Continued)

(52) U.S. Cl.
CPC .......... *G06N 20/00* (2019.01); *G06F 16/313* (2019.01); *G06F 40/253* (2020.01); *H04L 51/32* (2013.01)

(58) Field of Classification Search
CPC ...... G06N 7/005; G06N 99/005; G06N 20/00; H04L 51/32; G06F 40/253; G06F 16/313
USPC ....................................................... 706/1–62
See application file for complete search history.

(56) References Cited

U.S. PATENT DOCUMENTS

| | | | |
|---|---|---|---|
| 6,728,695 | B1 | 4/2004 | Pathria et al. |
| 10,360,407 | B2 | 7/2019 | Gordon et al. |

(Continued)

OTHER PUBLICATIONS

PCT International Search Report and Written Opinion, PCT Application No. PCT/US2020/029221, dated Jul. 20, 2020, 12 pages.
(Continued)

*Primary Examiner* — Brandon S Cole
(74) *Attorney, Agent, or Firm* — Fenwick & West LLP

(57) ABSTRACT

Evaluations of a document are generated that indicate likelihoods of the document achieving its objectives. The evaluations are based on predictive characteristics of one or more outcomes of the client document that are indicative of whether the document will achieve its objectives. Specifically, a server receives the document from a client device. The server extracts a set of features from the document. The evaluations of the document are generated based on the predictive characteristics for the one or more outcomes of the document. The generated evaluations are provided to the client device such that the document can be optimized to achieve its desired objectives. The optimized document may also be sent to a posting server for posting to a computer network. The known outcomes of the optimized document are collected through reader responses to the document and analyzed to improve evaluations for other documents.

15 Claims, 6 Drawing Sheets

Related U.S. Application Data

(60) Provisional application No. 62/166,598, filed on May 26, 2015.

(51) Int. Cl.
*H04L 51/52* (2022.01)
*G06F 16/31* (2019.01)
*G06F 40/253* (2020.01)

(56) References Cited

U.S. PATENT DOCUMENTS

| | | | |
|---|---|---|---|
| 10,553,308 | B2 | 2/2020 | Baldwin |
| 2004/0156854 | A1 | 8/2004 | Mulligan et al. |
| 2009/0006384 | A1 | 1/2009 | Tunkelang et al. |
| 2009/0282103 | A1 | 11/2009 | Thakkar et al. |
| 2010/0125502 | A1 | 5/2010 | Solomon et al. |
| 2012/0158630 | A1 | 6/2012 | Zaman et al. |
| 2013/0103624 | A1 | 4/2013 | Thieberger |
| 2013/0132832 | A1 | 5/2013 | Nakamura et al. |
| 2013/0159506 | A1* | 6/2013 | Stern .............. G06Q 50/01 709/224 |
| 2014/0156567 | A1* | 6/2014 | Scholtes ............ G06F 16/00 706/12 |
| 2014/0324758 | A1 | 10/2014 | Diaz |
| 2014/0343923 | A1 | 11/2014 | Heilman et al. |
| 2015/0032444 | A1 | 1/2015 | Hamada |
| 2015/0039294 | A1 | 2/2015 | Howald et al. |
| 2015/0052087 | A1 | 2/2015 | Srinivasan et al. |
| 2015/0317069 | A1 | 11/2015 | Clements et al. |
| 2015/0317562 | A1 | 11/2015 | Srinivasan et al. |
| 2015/0350116 | A1 | 12/2015 | Bhagwan |
| 2016/0203523 | A1* | 7/2016 | Spasojevic ......... G06Q 30/0269 705/14.66 |
| 2016/0232160 | A1* | 8/2016 | Buhrmann ............ G06F 16/367 |
| 2017/0220536 | A1 | 8/2017 | Chiba et al. |
| 2017/0364586 | A1 | 12/2017 | Krishnamurthy et al. |
| 2018/0060302 | A1 | 3/2018 | Liang et al. |
| 2018/0101599 | A1 | 4/2018 | Arnold et al. |
| 2018/0173692 | A1 | 6/2018 | Greenberg et al. |
| 2018/0373700 | A1 | 12/2018 | Farri et al. |
| 2019/0005019 | A1 | 1/2019 | Burke et al. |
| 2019/0042556 | A1 | 2/2019 | Anders et al. |
| 2020/0293608 | A1 | 9/2020 | Nelson et al. |

OTHER PUBLICATIONS

United States Office Action, U.S. Appl. No. 16/855,121, filed Nov. 24, 2020, 14 pages.
Extended European Search Report, European Application No. 16800622.9, dated Dec. 19, 2018, 7 pages.
PCT International Search Report and Written Opinion, PCT Application No. PCT/US16/33838, dated Aug. 25, 2016, 11 pages.
United States Office Action, U.S. Appl. No. 15/161,151, dated Dec. 5, 2018, 34 pages.
United States Office Action, U.S. Appl. No. 15/161,151, dated Apr. 4, 2019, 15 pages.
United States Office Action, U.S. Appl. No. 15/161,151, dated Jul. 29, 2019, 17 pages.
United States Office Action, U.S. Appl. No. 16/855,121, dated Mar. 24, 2021, 16 pages.

\* cited by examiner

USING MACHINE LEARNING TO PREDICT OUTCOMES FOR DOCUMENTS

CROSS-REFERENCE TO RELATED APPLICATIONS

This application is a continuation application of U.S. patent application Ser. No. 15/161,151, filed on May 20, 2016, which claims the benefit of U.S. Provisional Application No. 62/166,598, filed on May 26, 2015, each of which is incorporated by reference in its entirety.

BACKGROUND

Field of Disclosure

The present invention generally relates to analyzing documents, and more specifically to ways of analyzing documents to predict outcomes for documents posted on a computer network.

Description of the Related Art

Many documents are posted on a computer network with the desired objective of inducing responses to the document from certain types of readers. For example, a recruiting document is written with the objective of inducing qualified applicants to fill a job vacancy. The outcomes of a document are characteristics of reader responses to the document and are indicative of whether the document will achieve its objective. For example, outcomes of the recruiting document may include the number of applicants or the proportion of qualified applicants, both of which are indicative of whether the document will achieve its objective of filing a job vacancy with a qualified applicant. Therefore, it is advantageous to tailor and optimize the document before posting the document to induce desired outcomes that will help the document achieve its objective. However, it is difficult for a document author to know which types of outcomes the document will produce before it is posted on the network.

SUMMARY

The above and other issues are addressed by a method, computer-readable medium, and analysis server for evaluating an electronic document with respect to an objective. An embodiment of the method comprises receiving the electronic document from a client device via a computer network. The electronic document has content directed toward achieving an objective. The method comprises extracting a set of features from the content of the electronic document. The method also comprises evaluating the features in the set using one or more machine-learned models that indicate directions and degrees of correlation between the features extracted from the content of the electronic document and the objective to which the content of the document is directed to predict an outcome of the electronic document with respect to the objective. The method further comprises providing the predicted outcome to the client device.

An embodiment of the medium includes a non-transitory computer-readable medium storing executable computer program instructions for evaluating an electronic document with respect to an objective. The computer program instructions comprise receiving the electronic document from a client device via a computer network. The electronic document has content directed toward achieving an objective. The instructions comprise extracting a set of features from the content of the electronic document. The instructions also comprise evaluating the features in the set using one or more machine-learned models that indicate directions and degrees of correlation between the features extracted from the content of the electronic document and the objective to which the content of the document is directed to predict an outcome of the electronic document with respect to the objective. The instructions further comprise providing the predicted outcome to the client device.

An embodiment of the analysis server comprises a non-transitory computer-readable storage medium storing executable computer program instructions and a processor for executing the instructions. The computer program instructions comprise receiving the electronic document from a client device via a computer network. The electronic document has content directed toward achieving an objective. The instructions comprise extracting a set of features from the content of the electronic document. The istructions also comprise evaluating the features in the set using one or more machine-learned models that indicate directions and degrees of correlation between the features extracted from the content of the electronic document and the objective to which the content of the document is directed to predict an outcome of the electronic document with respect to the objective. The instructions further comprise providing the predicted outcome to the client device.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
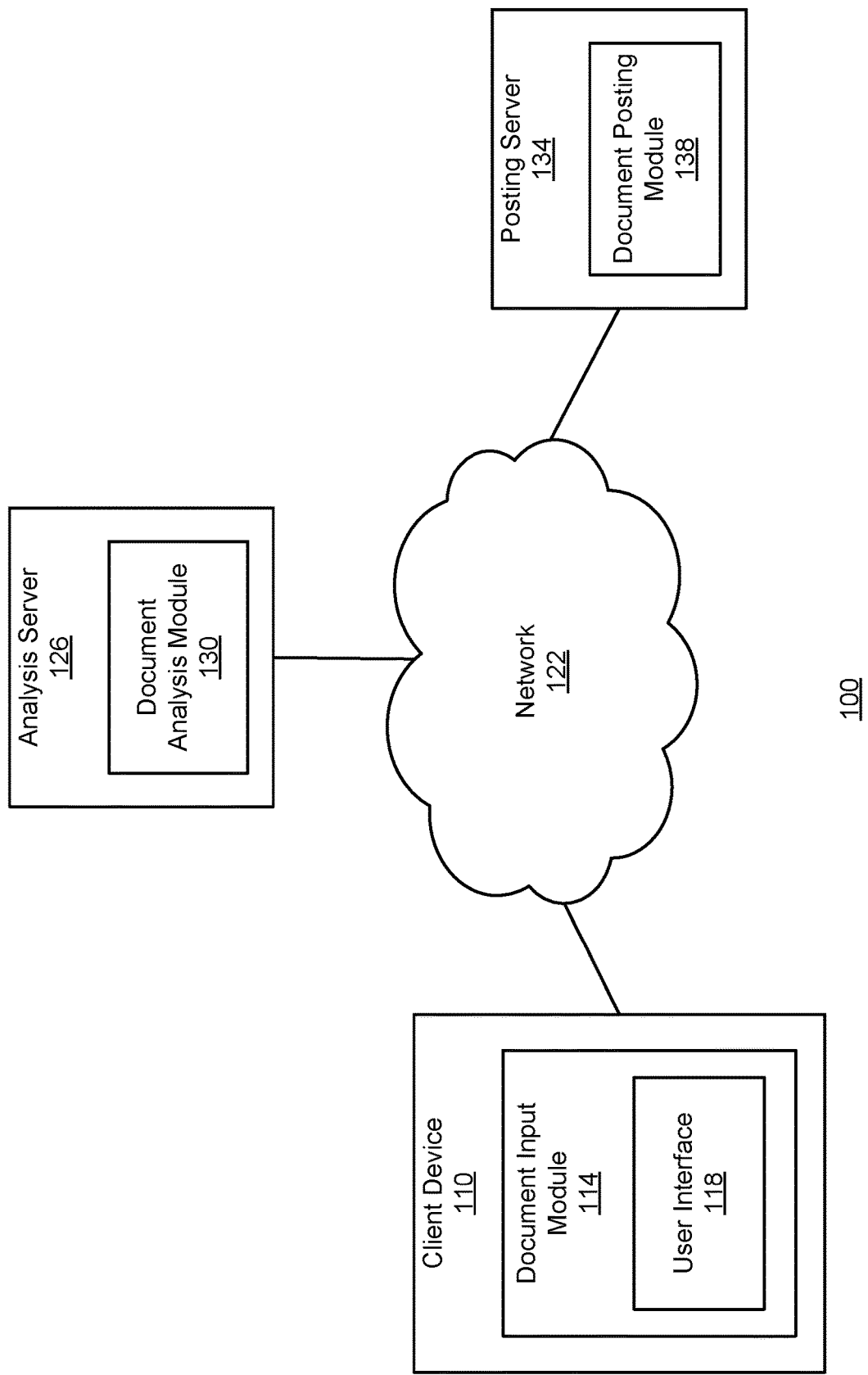
FIG. 1 is a high-level block diagram illustrating an embodiment of an environment for optimizing a document to achieve its desired objectives, according to one embodiment.

FIG. 1 is a high-level block diagram illustrating an embodiment of an environment 100 for optimizing a document to achieve its desired objectives, according to one embodiment. The environment includes a client device 110 connected by a network 122 to an analysis server 126 and a posting server 134. Here only one client device 110, one analysis server 126, and one posting server 134 are illustrated but there may be multiple instances of each of these entities. For example, there may be thousands or millions of client devices 110 in communication with one or more analysis servers 126 or posting servers 134.

The network 122 provides a communication infrastructure between the client devices 110, the analysis server 126, and the posting server 134. The network 122 is typically the Internet, but may be any network, including but not limited to a Local Area Network (LAN), a Metropolitan Area Network (MAN), a Wide Area Network (WAN), a mobile wired or wireless network, a private network, or a virtual private network.

The client device 110 is a computing device such as a smartphone with an operating system such as ANDROID® or APPLE® IOS®, a tablet computer, a laptop computer, a desktop computer, or any other type of network-enabled device. A typical client device 110 includes the hardware and software needed to connect to the network 122 (e.g., via Wifi and/or 4G or other wireless telecommunication standards).

The client device 110 includes a document input module 114 that allows the user of the client device 110 to interact with the analysis server 126 and the posting server 134. The document input module 114 allows the user to input a document as formatted text, and forwards the document to the analysis server 126 for evaluation or to the posting server 134 for posting to the computer network 122. The document input module 114 also presents any feedback data from the analysis server 126 or the posting server 134 back to the user of the client device 110. A client device 110 may also be used by a reader of a posted document to respond to the posting.

In one embodiment, the document input module 114 includes a browser that allows a user of the client device 110 to interact with the analysis server 126 and the posting server 134 using standard Internet protocols. In another embodiment, the document input module 114 includes a dedicated application specifically designed (e.g., by the organization responsible for the analysis server 126 or the posting server 134) to enable interactions among the client device 110 and the servers. In one embodiment, the document input module 114 includes a user interface 118 that allows the user of the client device 110 to edit and format the document and also presents feedback data about the document from the analysis server 126 or the posting server 134 to the client device 110.

Generally, the content of the document includes text written and formatted by an author directed towards achieving one or more desired objectives when presented to readers. A document may be classified into different types depending on its primary objective. For example, a document may be classified as a recruiting document when the primary objective of the document is to gather candidates to fill a vacant job position at a business organization. As another example, the document may be classified as a campaign speech when the primary objective of the document is to relay a political message of a candidate running for government office to gather a high number of votes for an election.

The analysis server 126 includes a document analysis module 130 that extracts a set of features from an input document, analyzes the features, and outputs evaluations of the document that indicate likelihoods of whether the document will achieve a defined set of objectives, including its primary objective. Each evaluation may be associated with a specific objective of the document. For example, one evaluation may be a favorability score that indicates the likelihood a recruiting document will achieve its objective of filling a vacant job position with a qualified applicant. As another example, an evaluation may be a likelihood that the recruiting document will achieve its objective of receiving gender neutral responses, indicating no gender bias. Each evaluation may be based on one or more predicted outcomes of the document, which are predicted characteristics of reader responses to the document.

The set of objectives for an input document are defined based on the type of the input document and indicate common goals that authors for the type of document are interested in achieving, and may include objectives relating to demographic information of people responding to the document. The set of objectives may differ across different types of documents due to different desired outcomes. For example, an author of a campaign speech may be interested in the objective of collecting a high number of voters for the political candidate, but may also be interested in additional demographic objectives such as gathering votes from a certain location, or gathering votes from people with a certain socio-economic background. As another example, an author of a recruiting document may be interested in the objective of collecting a high number of applicants for a vacant job opening, but may also be interested in additional recruiting objectives such as hiring a candidate with an engineering background, which may not be of interest to the author of the campaign speech document.

In one embodiment, an administrator of the analysis server 126 specifies the set of objectives for an input document depending on its type. In another embodiment, the analysis server 126 may specify a large set of potential objectives for the input document to the user of the client device 110, and the user may select a subset of the potential objectives for which the document analysis module 130 would perform the evaluations.

The results of the evaluations are provided back to the client device 110 and the document may be automatically or manually optimized based on the evaluations to improve its likelihood of achieving its desired objectives. Each evaluation may be presented in various forms, such as a numerical score, a scale, or a plot, but is not limited thereto.

The posting server 134 includes a document posting module 138 that posts the optimized document and receives outcome data on the optimized document. For example, the document posting module 138 may post a recruiting document optimized based on the evaluations received by the document analysis module 130. After the document has been posted, the document posting module 138 may receive applications for the posted position, as well as outcome data describing characteristics of people who responded to the document. The collected outcome data may be provided to the document analysis module 130 in order to refine evaluations on other documents, and also may be provided back to the client device 110.

Thus, the environment 100 shown in FIG. 1 optimizes a document to achieve its desired objectives by providing evaluations of the document and tailoring the document based on the evaluations. The environment 100 also posts the document and collects outcome data for the document that can be used to refine evaluations on other documents.

Figure 2:
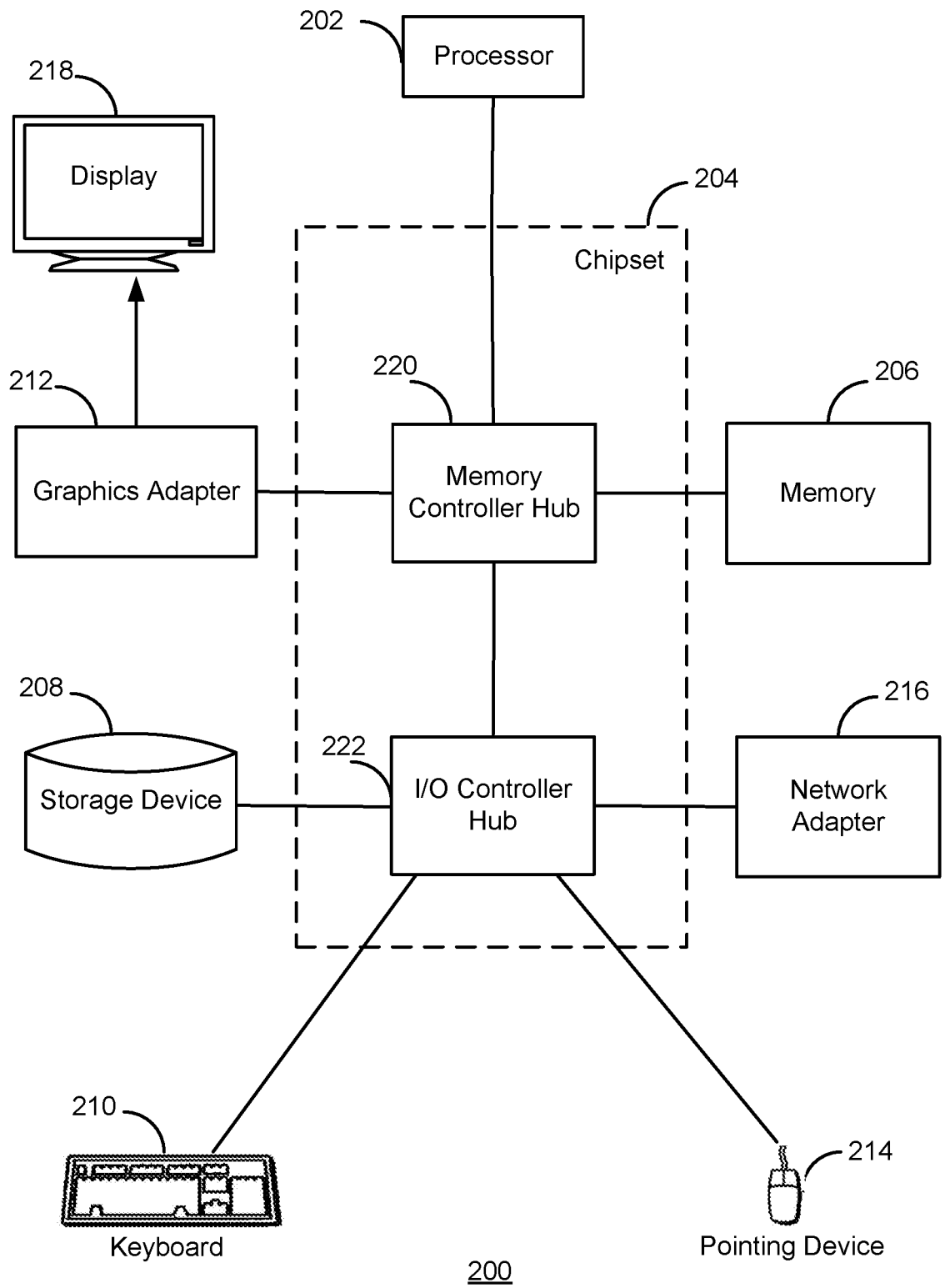
FIG. 2 is a high-level block diagram illustrating an example computer for implementing the client device, the analysis server, and/or the posting server of FIG. 1.

FIG. 2 is a high-level block diagram illustrating an example computer 200 for implementing the client device 110, the analysis server 126, and/or the posting server 134 of FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, an input device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The input interface 214 is a touch-screen interface, a mouse, track ball, or other type of pointing device, a keyboard, or some combination thereof, and is used to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. The computers 200 can lack some of the components described above, such as graphics adapters 212, and displays 218. For example, the analysis server 126 can be formed of multiple blade servers communicating through a network such as in a server farm.

Figure 3:
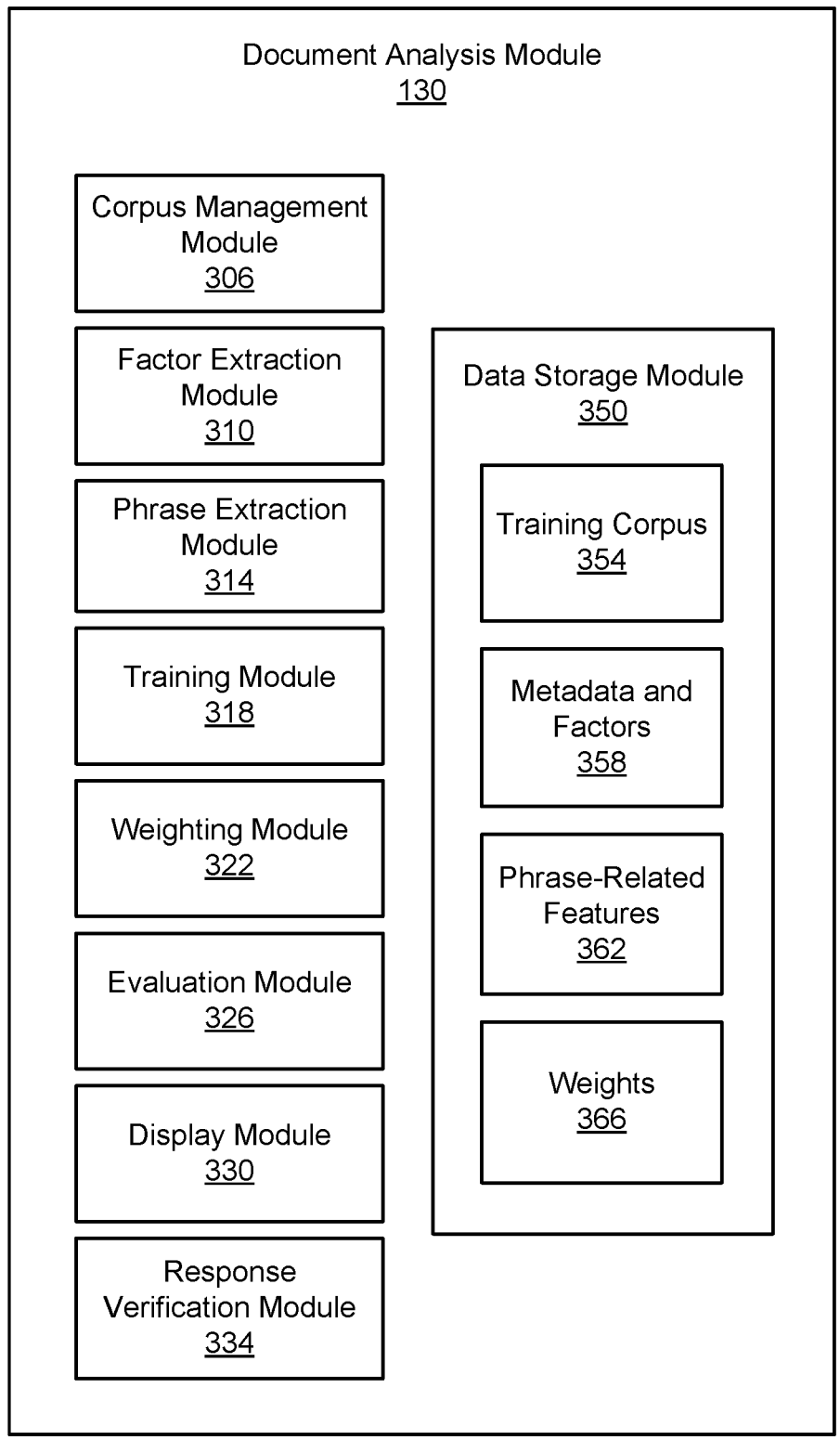
FIG. 3 is a high-level block diagram illustrating a detailed view of the document analysis module of the analysis server, according to one embodiment.

FIG. 3 is a high-level block diagram illustrating a detailed view of the document analysis module 130 of the analysis server 126, according to one embodiment. The document analysis module 130 is comprised of modules including a data storage module 350, a corpus management module 306, a factor extraction module 310, a phrase extraction module 314, a training module 318, a weighting module 322, an evaluation module 326, a display module 330, and a response verification module 334. Some embodiments of the document analysis module 130 have different modules than those described here. Similarly, the functions can be distributed among the modules in a different manner than is described here.

The data storage module 350 stores data used by the document analysis module 130. The data include a training corpus 354, metadata and factors 358, phrase-related features 362, and weights 366. The training corpus 354 is a collection of documents that are presented to readers and are associated with a set of known outcomes.

The corpus management module 306 generates, maintains, and updates the training corpus 354. The corpus management module 306 may collect documents in the training corpus 354, as well as their outcomes, from various sources. In one instance, the corpus management module 306 collects documents that were previously posted and presented to readers, and have a set of known outcomes. These documents may include documents posted, and corresponding outcome data received, by the posting server 134. The corpus management module 306 may also collect documents by crawling websites on the network, or may be provided with such documents by entities such as business organizations. In another instance, the corpus management module 306 automatically collects outcome data on currently posted documents through techniques such as user telemetry. In one embodiment, the corpus management module 306 continuously and automatically updates the training corpus 354 as new documents with a set of known outcomes are received from various sources or the posting server 134.

In one embodiment, the set of outcomes associated with documents include characteristics of reader responses to the document. The characteristics may describe the number of responses, types of responses, timeliness of responses, and demographic information about the responders. The demographic information relates to any specific characteristics of the responders, and may relate to, for example, the gender, ethnicity, qualification levels, titles, and personality traits (e.g., introverted or extroverted) of the responders. For example, possible outcomes for a recruiting document may include the number of applicants, time required to fill the vacant position described in the document, proportion of qualified applicants, proportion of male versus female applicants, current job titles of the applicants, and proportion of applicants under a certain age, but is not limited thereto.

The set of outcomes are indicative of whether the document will achieve its desired objectives in the future. Returning to the example of a recruiting document, the number of applicants or the proportion of qualified applicants may be highly indicative of whether the document will achieve its objective of hiring a qualified candidate for a vacant position. As another example, the proportion of female versus male applicants is highly indicative of whether the document will achieve its objective of acquiring gender neutral responses. Thus, achieving desired outcomes for a document are directly related to achieving the desired objectives for the document. The values of the set of outcomes for documents in the training corpus 354 are already known, as the documents have previously been posted on a computer network.

The factor extraction module 310 and the phrase extraction module 314 each extract sets of features from documents. The sets of features uniquely characterize a document and are features of a document that are expected to correlate with outcomes of the document. As described in more detail below, the sets of features include metadata, linguistic factors, and phrase-related features of a document. The identified features may be different for each document type as the relevant outcomes and objectives are different between each type of document.

The factor extraction module 310 extracts metadata and linguistic factors from documents. The metadata includes information about the document other than the content of the document. This may include, for example, the title of the document, geographical locations associated with the document, or any other data that may correlate with the outcomes of the document. For example, the factor extraction module 310 may extract the job location for a recruiting document, as well as the industry and field of the job in the recruiting document.

The linguistic factors include syntactic, structural, and semantic factors extracted from the content of the documents. Syntactic factors relate to the set of rules, principles, and processes that govern the structure of sentences in the documents. For example, syntactic factors include the proportion and frequency of verbs, the average length of phrases, clauses, sentences, n-grams and how they are assembled together, sentence complexity, and speech density, but is not limited thereto. Structural factors relate to the structure and layout of the document content. For example, structural factors may include word counts, sentence counts, character counts, the proportion of text in italic font, and the proportion of content in bulleted lists, but is not limited thereto. Semantic factors relate to the meaning of words, phrases, and sentences in the documents based on their ordering. For example, whether a company's recruiting document contains an equal opportunity statement is a semantic factor.

In one embodiment, the factor extraction module 310 generates semantic factor models for determining the presence and strength of semantic factors in documents given a set of predetermined syntactic and structural factors of the documents. For example, the factor extraction module 310 may generate a model that determines the presence and strength of an equal opportunity statement in a document given certain n-grams or significant phrases (e.g., "equal," "opportunity," "male," "female") of the document.

The presence of a semantic factor is a feature indicating whether a semantic factor is present in documents, and is represented by a binary value (e.g., 0 or 1, "existing equal opportunity statement" or "no equal opportunity statement") to indicate the presence. The strength of a semantic factor is a feature indicating the degree of presence of the semantic factor, and may be represented by discrete values (e.g., "very strong equal opportunity statement," "strong equal opportunity statement," "weak equal opportunity statement") or may be represented by continuous numerical values (e.g., number on a scale from 0 to 100 or confidence levels). In one instance, the model may be determined by analyzing labeled documents in the training corpus 354 which are labeled with known values for the presence and strength of semantic factors in the documents.

The factor extraction module 310 extracts metadata and linguistic factors from documents in the training corpus 354 and stores them as metadata and factors 358 in the data storage module 350, along with the semantic factor models.

The phrase extraction module 314 extracts phrase-related features from documents. The phrase-related features indicate the presence of distinctive phrases associated with a category and their level of association to the category. For example, the set of distinctive phrases "the Apple, Big Apple, upstate, Empire State, Broadway," may be associated with the category "phrases related to New York City." As another example, the set of distinctive phrases "core competency, move the needle, corporate values, think outside the box, leverage, drill down," may be associated with the category "phrases related to corporate jargon."

The phrase extraction module 314 identifies associations between distinctive phrases and corresponding categories by analyzing documents. In one embodiment, the phrase extraction module 314 determines the associations between distinctive phrases and corresponding categories by extracting phrases that correlate with certain outcomes or metadata across documents in the training corpus 354. The categories associated with distinctive phrases may be assigned based on the outcomes or metadata of the documents.

For example, the phrase extraction module 314 may identify distinctive phrases that occur most frequently in recruiting documents with the outcome of a high proportion of female applicants and may assign the category "phrases likely to attract female candidates," to the identified phrases. As another example, the phrase extraction module 314 may identify distinctive phrases that occur most frequently in recruiting documents in the pharmaceutical industry and may assign the category "phrases related to pharmaceuticals," to the identified phrases. As another example, the phrase extraction module 314 may identify distinctive phrases that occur frequently in recruiting documents with the outcome of a small number of applicants and may assign the category "negative phrases," to the identified phrases. The extracted set of negative phrases may further be divided and each assigned to separate categories of "obscene phrases," "corporate jargon," and "offensive language."

Based on the associations identified above from the training corpus 354, the phrase extraction module 314 extracts phrase-related features from documents including the presence of distinctive phrases associated with a category and their level of association with the category. The presence of distinctive phrases associated with a category is a feature indicating whether a document contains any phrases that are associated with a certain category, and may be represented by a binary value. For example, for a given document, the presence of "phrases related to corporate jargon" may have a binary value of 0 or 1 depending on whether the document contains any one of the phrases "core competency, move the needle, corporate values, think outside the box, leverage, drill down."

The level of association between distinctive phrases and their category is a feature indicating how strong of an association the distinctive phrases in a document have with their corresponding category, and may be represented by discrete or numerical values. For example, for a given document having one or more distinctive phrases associated with the category "obscene phrases," the level of association with the category may be represented by discrete levels of "not obscene," "somewhat obscene," "obscene," and "very obscene," or may be represented by continuous numerical values (e.g., number on a scale from 0 to 100 or confidence levels). In one embodiment, the level of association may also be determined based on the analysis performed by the phrase extraction module 314 on the training corpus 354.

For each document in the training corpus 354, the phrase extraction module 314 identifies phrase-related features that include the presence of any distinctive phrases in corresponding categories and the phrases' levels of association to the categories, and stores them as phrase-related features 362 in the data storage module 350. The identified associations between distinctive phrases and their corresponding categories are also stored as phrase-related features 362 in the data storage module 350.

The training module 318 generates one or more machine-learned models that predict outcomes for documents given the set of features extracted from the documents. The set of features includes the metadata, linguistic factors, and the phrase-related features identified through the factor extraction module 310 and the phrase extraction module 314. The models are generated based on the features extracted from documents in the training corpus 354 and the known outcomes of the documents in the training corpus 354. For example, the training module 318 may generate the models by correlating the set of features for each document in the training corpus 354 (stored as metadata and factors 358 and phase-related features 362) with the corresponding known outcomes for each document. Given a set of features, the training module 318 may train individual models that predict a single outcome, or may train models that predict multiple outcomes or a combination of outcomes.

Returning to the example of a recruiting document, the training module 318 may generate a model that predicts the number of applicants for a document upon receiving a set of extracted features for the document. As discussed above, example features may be the presence of an equal opportunity statement, location of the job, and presence of "phrases related to corporate jargon." As another example, the training module 318 may train a different model that predicts the proportion of male applicants given the same set of extracted features for the document. As another example, the training module 318 may train a single model that predicts both outcomes at once given the same set of extracted features for the document.

The generated models indicate a direction and degree of correlation between the features and outcomes of documents through coefficients generated for each of the features. For example, the machine-learned models may indicate directions and degrees of correlation between the presence and strength of distinctive phrases in recruiting documents and demographic information of people who respond to the recruiting documents. In one embodiment, the sign of the coefficient indicates the direction of the correlation, and the absolute value of the coefficient indicates the degree of correlation. For example, a trained model relating the set of features to the number of applicants for a document may indicate that the presence of "obscene phrases" is negatively correlated with high degree of significance through a negative coefficient having a large absolute value. As another example, the same model may indicate that the presence of a strong equal opportunity statement is positively correlated with high degree of significance through a positive coefficient having a large absolute value.

Features that are statistically significant may differ across each outcome. For example, the proportion of bullet point content may have a significant correlation with the outcome of the number of applicants, but may have an insignificant correlation with the proportion of veteran applicants.

In one embodiment, the training module 318 continuously and automatically updates the trained models as the training corpus 354 is updated with new documents. By updating the models, the training module 318 is able to identify new correlations between the set of features and outcomes of a document, as well as modify or delete existing correlations to capture any changing patterns over time.

The weighting module 322 assigns a weight to each feature in the set of features for an outcome based on the trained models generated by the training module 318 for that outcome. Specifically, a weight assigned to a feature may indicate the predictive power of the feature for the outcome. Similarly to the coefficients identified in the trained models, the weight assigned for each feature may include the direction and degree of correlation between the features and an outcome, and may be represented by a positive number or a negative number.

The weights may be assigned based on the coefficients identified through the trained models, but are not required to be identical to the coefficients for that outcome. For example, the weights assigned to a set of features indicating predictive power for the outcome of the proportion of female applicants may be a constant factor or a translation of the coefficients identified through a corresponding trained model relating the set of features to the outcome. As another example, multiple features may be assigned the same numerical weight for a certain outcome if the corresponding coefficients identified through the trained model for the outcome are above or below a predetermined threshold.

The weighting module 322 may automatically update the weights as the trained models are updated by the training module 318. The weights are saved as weights 366 in the data storage module 350.

Responsive to receiving an input document from the client device 110, the evaluation module 326 extracts the set of features identified by the factor extraction module 310 and the phrase extraction module 314 from the input document, and outputs evaluations of the input document that are likelihoods of whether the document will achieve its set of defined objectives. As mentioned earlier, the defined objectives for the document may be determined based on the type of document and/or may be specified by the user that provided the document. Each evaluation is associated with an objective of a document, and is based on predictive characteristics of one or more outcomes of the input document. The predictive characteristics are identified through the trained models generated by the training module 318. The evaluations may come in the form of a numerical score or a visual scale indicating the degree of bias, but is not limited thereto.

In one embodiment, the evaluation module 326 may generate the evaluations by applying the trained models to the set of extracted features of the input document to generate predicted values for the one or more outcomes of the input document. The evaluation module 326 may combine the predicted outcomes to generate the evaluations. For example, an evaluation indicating the likelihood a recruiting document will achieve its objective of filling a vacant job position may be generated by extracting the set of features from the input document, applying the trained models for predicting the number of applicants and the proportion of qualified applicants, and combining the predicted values for the outcomes into a normalized score.

In another embodiment, the evaluation module 326 may generate the evaluations by summing the weights of the features in the input document for the one or more outcomes. As discussed above in conjunction with the weighting module 322, the weights associated with the set of features for an outcome are assigned based on the predictive power of the features for that outcome, and are identified through the trained models for that outcome. For example, for an evaluation based on the outcome of the number of applicants, the evaluation module 326 may identify the presence of "obscene phrases," having a weight of −5 for the outcome, the presence of "phrases related to corporate jargon," having a weight of −6 for the outcome, and the presence of an equal opportunity statement, having a weight of +3 for the outcome, in the input document. The evaluation module 326 may then generate the evaluation by scaling the sum of the weights, −8, to a normalized score.

As another example, for an evaluation of whether a document will receive a gender neutral response based on the outcome of the proportion of male versus female applicants, the evaluation module 326 may identify the presence of an equal opportunity statement, having a weight of +10 for the outcome, the presence of "phrases likely to attract females," having a weight of −6 for the outcome, and the presence of "phrases related to Seattle," having a weight of +1 for the outcome, in the input document. The evaluation module 326 may then output the sum of the weights, +5, to indicate the likelihood.

Thus, the evaluation module 326 evaluates the set of features in the input document using one or more machine-learned models that indicate directions and degrees of correlation between the features extracted from the input document and the objective to which the document is directed to predict an outcome of the input document with respect to its objective.

In one instance, the evaluation module 326 may rank the set of features in the input document according to their weights for the one or more outcomes of an evaluation. In one instance, the evaluation module 326 may rank the set of features according to the absolute value of their corresponding weights, as a higher absolute value translates to a higher contribution to the outcome, and thus, a higher contribution to the evaluation.

The evaluation module 326 may filter out a subset of the features in the input document based on the rankings. In one embodiment, the filtered features may be determined by ordering the set of features according to their absolute value of weights and selecting a predetermined number or proportion of features that are ranked the highest. In another embodiment, the filtered features may be determined by ordering the set of features within each group of positive and negative weights, and selecting a predetermined number or proportion of features that are ranked the highest within each group.

The filtered features may later be presented to the user of the client device 110 through the display module 330 to indicate which features contribute significantly to an evaluation. Thus, the input document may be optimized based on the filtered features to increase its likelihood of achieving its objectives. The evaluation module 326 provides the evaluation results including the evaluations and the filtered features to the display module 330 for presentation to the user of the client device 110.

The display module 330 presents the evaluation results of the input document, as well as phrase highlights in the input document to the user of the client device 110 through the user interface 118. Specifically, the display module 330 receives evaluation results generated by the evaluation module 326 for the input document and graphically presents the results in the context of the input document through the user interface 118. This includes displaying the evaluations performed on the input document and the filtered features for any of the presented evaluations.

The display module 330 also identifies distinctive phrases in the content of the input document, and, for each identified distinctive phrase, indicates the influence of the distinctive phrase on the predicted outcomes used to evaluate the input document with respect to its objectives. In one embodiment, the display module 330 identifies and highlights any distinctive phrases in the input document that have a corresponding phrase-category association as identified in phrase-related features 362 in the user interface 118. In another embodiment, the evaluation module 326 identifies distinctive phrases in the input document, and provides this information to the display module 330 such that the corresponding phrases can be highlighted in the user interface 118. The categories of the distinctive phrases are also displayed in the user interface 118.

The display module 330 enables the input document to be edited and revised through the user interface 118 to improve its likelihood of achieving its set of objectives. Specifically, the input document may be optimized based on the evaluation results presented by the display module 330. As an example, a recruiting document having an undesirable evaluation may be presented with a filtered feature indicating the presence of "obscene phrases" in the input document. Upon receiving the evaluation results, the input document may be revised to eliminate all "obscene phrases" to improve its evaluation and to improve its likelihood of achieving its desired outcomes. The revised input document is again provided to the evaluation module 326, and updated evaluation results are displayed to the user of the client device 110 by the display module 330 as the input document is being revised. In this manner, the evaluation results for an input document may automatically be updated such that the input document is optimized to target desired outcomes before being posted to a computer network.

Figure 4:
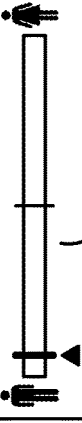
FIG. 4 is an example user interface for an input document displaying evaluation results and phrase highlights for the input document.

FIG. 4 is an example user interface 118 for an input document displaying evaluation results and phrase highlights for the input document. In one embodiment, the user interface 118 is generated by the display module 330 and provided to the client device 110 for display thereon.

As shown in the example in FIG. 4, the display module 330 generates a phrase highlight 410 on the phrase "crazy" based on its associated category 414 "Masculine" in one outlined pattern. As another example, the display module 330 generates a phrase highlight on the phrase "buy-in" based on its associated category of "Repetitive" phrases.

As shown in FIG. 4, for the recruiting document of a "General Market Media Buyer," a favorability score 418 of "72" indicating the likelihood the recruiting document will achieve its objective of filling the vacant position is generated by the evaluation module 326 and is presented on the user interface 118 by the display module 330. A set of filtered features 422 and 426 are also identified and presented for the favorability score evaluation. Specifically, the set of filtered features contain features with positive weight 422 that contributed to increasing the favorability score. These include, for example, features relating to the use of positive language and the length of the document. The set of filtered features also contain features with negative weight 426 that contributed to decreasing the favorability score. These include, for example, features relating to using corporate jargon and a missing equal opportunity statement in the document.

As another example shown in FIG. 4, the evaluation 430 indicating the likelihood of gender neutral responses is displayed in the form of a scale. The left-most side corresponds to a low likelihood of achieving gender neutral responses due to a high prediction of male responses, and the right-most side corresponds to a low likelihood of achieving gender neutral responses due to a high prediction of female responses. Although not shown in FIG. 4, the filtered features for this particular evaluation may include, for example, features relating to the presence and strength of "female" phrases, the presence and strength of "male" phrases, and the presence and strength of an equal opportunity statement.

Once the document has been optimized, the document input module 114 may provide the optimized input document to the document posting module 138 in the posting server 134. As discussed above, the document posting module 138 posts optimized documents to a computer network and collects outcome data for the posted documents, and provides this information back to the response verification module 334 for further analysis.

Returning to the document analysis module 130 shown in FIG. 3, the response verification module 334 verifies whether the evaluations generated by the document analysis module 130 are reliable based on the outcome data received from the document posting module 138 on documents that have already been evaluated, optimized, and posted. The response verification module 334 provides the optimized documents and outcome data to other modules of the document analysis module 130 for improving evaluations on other documents.

The response verification module 334 compares the actual outcomes for the optimized documents to their corresponding evaluations to determine whether the document analysis module 130 is generating reliable evaluations with respect to the given objectives. In one embodiment the response verification module 334 uses predetermined thresholds to evaluate whether an evaluation is considered "reliable." For example, if the evaluation indicates a high likelihood that the document will attract gender-neutral responses (e.g., an equal proportion of male and female responders), the response verification module 334 may apply a predetermined threshold to the actual gender outcome for the document to determine whether the evaluation was reliable. The threshold may indicate that the responses were not gender-neutral, and hence the evaluation was not reliable, if the more than, e.g., 65% of responders have the same gender.

In one instance, the response verification module 334 periodically provides the verification information to the other modules of the document analysis module 130 when new optimized documents and their outcome data are received from the document posting module 138. In another instance, the response verification module 334 automatically provides this information when the verification performed by the response verification module 334 indicates that the document analysis module 130 is increasingly generating unreliable evaluations. For example, this may occur when the response verification module 334 determines that a proportion of optimized documents above a specified threshold are generating unreliable evaluations with respect to some or all outcomes.

In one instance, the response verification module 334 provides the optimized documents and the outcome data to the corpus management module 306 such that the corpus management module 306 may improve the content of the training corpus 354. For example, the corpus management module 306 may add the optimized documents and corresponding outcome data to the training corpus 354. An updated set of features, models, and weights may be generated based on the updated training corpus 354, such that new trends or patterns are extracted by the various modules of the document analysis module 130. Similarly, the corpus management module 306 may delete documents in the training corpus 354 and replace them with the optimized document and outcome data received from the document posting module 138.

In another instance, the response verification module 334 provides the optimized documents and the outcome data to the factor extraction module 310 and/or the phrase extraction module 314 such that the modules may improve the set of features. For example, the phrase extraction module 314 may identify the presence of the phrase "Artificial Intelligence" as frequently occurring in documents with high evaluations and high desired outcomes, and may update the set of features to include this feature. As another example, the factor extraction module 310 and the phrase extraction module 314 may identify features that are contributing to unreliable evaluations and may delete these features from the set of features.

In this manner, input documents may go through an automated cycle of being evaluated, optimized, posted, and re-evaluated for improving evaluations on other documents. Specifically, an input document is provided to the document analysis module 130, evaluated based on its set of defined objectives and optimized based on the generated evaluations. The optimized document is posted to a computer network through the document posting module 138, and actual outcome data on the optimized document is collected and provided back to the document analysis module 130 to improve the evaluations of other documents.

Figure 5:
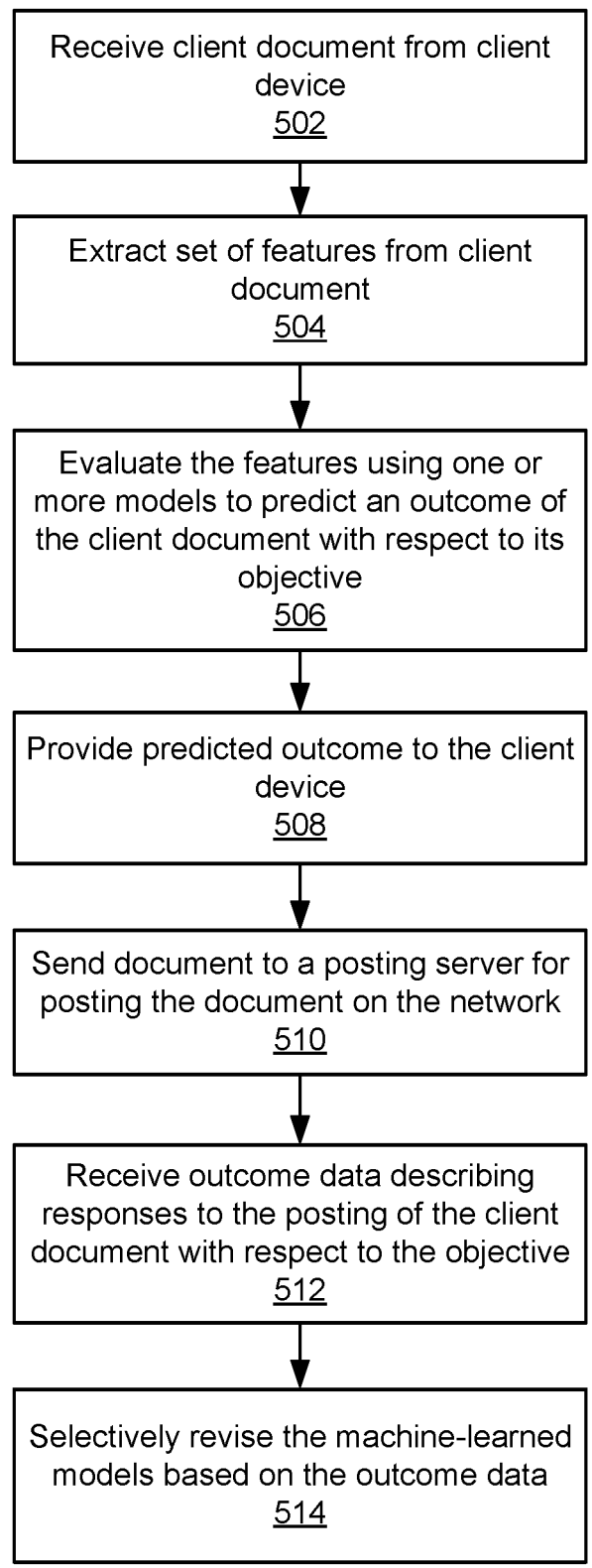
FIG. 5 is a flowchart illustrating a process of generating an evaluation for a document, according to one embodiment.

FIG. 5 is a flowchart illustrating a process of generating an evaluation for a document, according to one embodiment. In one embodiment, the process of FIG. 5 is performed by the analysis server 126. Other entities may perform some or all of the steps of the process in other embodiments. Likewise, embodiments may include different and/or additional steps, or perform the steps in different orders.

A client document is received 502 from a client device. The client document includes content directed towards achieving an objective. A set of features is extracted 504 from the content of the client document. The features in the set of features are evaluated 506 using one or more machine-learned models that indicate directions and degrees of correlation between the features extracted from the content of the client document and the objective to which the content of the document is directed to predict an outcome of the client document with respect to its objective. The predicted outcome is provided 508 to the client device.

In one embodiment, the evaluated client document is sent 510 to a posting server 134 such that the client document can be posted on the computer network by the posting server. Readers may respond to the posted document. The outcome data describing responses to the posting of the client document with respect to the objective are received 512 from the posting server 134. The machine-learned models are selectively revised 514 based on the received outcome data.

Figure 6:
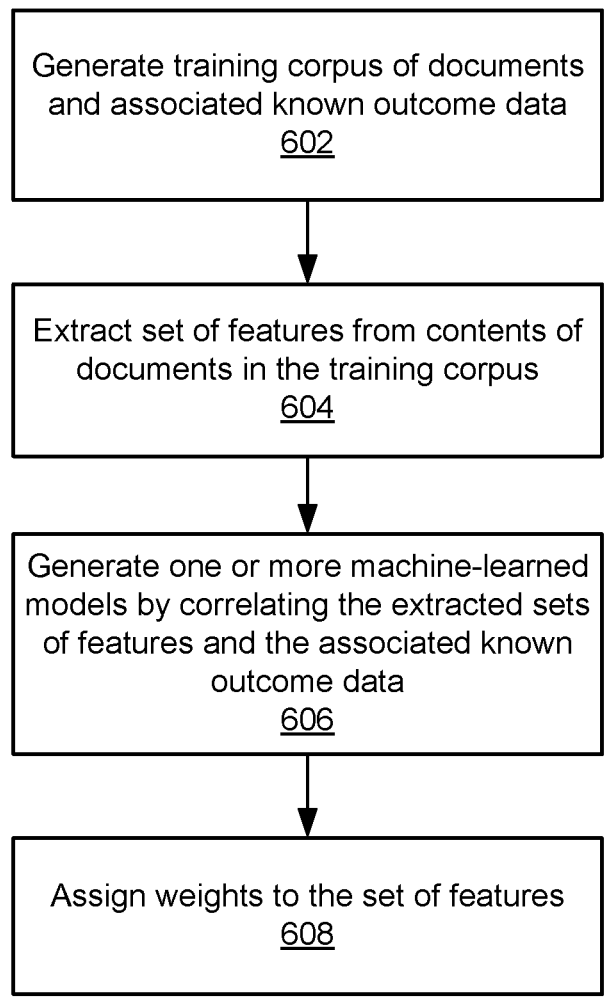
FIG. 6 is a flowchart illustrating a process of generating trained models used to generate an evaluation for a document, according to one embodiment.

FIG. 6 is a flowchart illustrating a process of generating machine-learned models used to generate an evaluation for a document, according to one embodiment. In one embodiment, the process of FIG. 6 is performed by the analysis server 126. Other entities may perform some or all of the steps of the process in other embodiments. Likewise, embodiments may include different and/or additional steps, or perform the steps in different orders.

A training corpus of documents is generated 602 by gathering electronic documents and associated known outcome data describing known outcomes resulting from postings of the electronic documents on the network. The set of features is extracted 604 from contents of each of the documents in the training corpus. One or more machine-learned models are generated 606 by correlating the extracted sets of features extracted from the contents of the documents with the associated known outcome data. In one embodiment, weights are assigned 608 to the set of features based on the one or more machine-learned models.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating evaluations of documents based on one or more outcomes of the document. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method of evaluating an electronic document with respect to an objective, comprising:
   receiving the electronic document from a client device via a computer network, the electronic document having content directed toward achieving the objective;
   extracting a set of features from the content of the electronic document;
   evaluating the features in the set using one or more machine-learned models that indicate directions and degrees of correlation between the features extracted from the content of the electronic document and the objective to which the content of the document is directed to predict an outcome of the electronic document with respect to the objective, evaluating the features comprising:
      assigning weights to the features in the set, a weight assigned to a feature indicating a direction and degree of correlation between the feature and the predicted outcome of the electronic document, and
      combining the weights of the set of features to predict the outcome of the electronic document;
   ranking the features in the set according to the directions and degrees of correlation between the features and the predicted outcome of the electronic document, ranking the features comprising:
      identifying a positive set of features having positive weights that indicate a positive correlation between the weights and the predicted outcome, and a negative set of features having negative weights that indicate a negative correlation between the weights and the predicted outcome, and
      ranking features within each of the positive set of features and the negative set of features according to absolute values of the weights associated with the features;
   filtering the features in the set based on the rankings of the features in the set to produce a positive subset of filtered features identified to increase a predicted likelihood that the content of the electronic document will achieve the objective and a negative subset of filtered features identified to decrease the predicted likelihood that the content of the electronic document will achieve the objective, filtering the features comprising selecting a subset of the positive set of features as the positive subset of filtered features and another subset of the negative set of features as the negative subset of filtered features based on the rankings in each set; and
   providing the predicted outcome and the positive subset of filtered features and the negative subset of filtered features to the client device, wherein the client device is adapted to display the positive subset of filtered features and the negative subset of filtered features adjacent to portions of the electronic document.

2. The method of claim 1, further comprising:
   establishing a training corpus of electronic documents and associated known outcome data describing known outcomes resulting from postings of the electronic documents on the computer network;
   extracting a set of training features from contents of the electronic documents in the training corpus; and
   generating the one or more machine-learned models by correlating the sets of training features extracted from the contents of the electronic documents in the training corpus and the associated known outcome data.

3. The method of claim 1, further comprising:
   posting the electronic document on the computer network;
   receiving outcome data describing responses to the posting of the electronic document on the computer network with respect to the objective; and
   selectively revising the machine-learned models based on the outcome data.

4. The method of claim 1, wherein extracting the set of features from the content of the electronic document comprises:
   extracting syntactic factors describing a structure of sentences in the content of the electronic document;
   extracting structural factors relating to structure and layout of the content of the electronic document; and
   extracting semantic factors relating to meaning of the content in the electronic document.

5. The method of claim 1, wherein extracting the set of features from the content of the electronic document comprises:
   extracting phrase-related features indicating presence of distinctive phrases in the content of the electronic document, the phrase-related features indicating categories corresponding to the distinctive phrases and the distinctive phrases' levels of association with the corresponding categories.

6. The method of claim 1, wherein providing the predicted outcome to the client device comprises:
   providing a user interface for display on the client device, the user interface identifying a plurality of distinctive phrases in the content of the electronic document and, for each identified distinctive phrase, indicating an influence of the distinctive phrase on the predicted outcome of the electronic document with respect to the objective.

7. The method of claim 1, wherein the electronic document is a recruiting document, the objective relates to demographic information of people responding to the recruiting document, the predicted outcome predicting characteristics of reader responses to the electronic document, and indicating a likelihood that the electronic document will achieve the objective.

8. A non-transitory computer-readable storage medium storing computer program instructions executable to perform operations for evaluating an electronic document with respect to an objective, the operations comprising:
receiving the electronic document from a client device via a computer network, the electronic document having content directed toward achieving the objective;
extracting a set of features from the content of the electronic document;
evaluating the features in the set using one or more machine-learned models that indicate directions and degrees of correlation between the features extracted from the content of the electronic document and the objective to which the content of the document is directed to predict an outcome of the electronic document with respect to the objective, evaluating the features comprising:
assigning weights to the features in the set, a weight assigned to a feature indicating a direction and degree of correlation between the feature and the predicted outcome of the electronic document, and
combining the weights of the set of features to predict the outcome of the electronic document;
ranking the features in the set according to the directions and degrees of correlation between the features and the predicted outcome of the electronic document, ranking the features comprising:
identifying a positive set of features having positive weights that indicate a positive correlation between the weights and the predicted outcome, and a negative set of features having negative weights that indicate a negative correlation between the weights and the predicted outcome, and
ranking features within each of the positive set of features and the negative set of features according to absolute values of the weights associated with the features;
filtering the features in the set based on the rankings of the features in the set to produce a positive subset of filtered features identified to increase a predicted likelihood that the content of the electronic document will achieve the objective and a negative subset of filtered features identified to decrease the predicted likelihood that the content of the electronic document will achieve the objective, filtering the features comprising selecting a subset of the positive set of features as the positive subset of filtered features and another subset of the negative set of features as the negative subset of filtered features based on the rankings in each set; and
providing the predicted outcome and the positive subset of filtered features and the negative subset of filtered features to the client device, wherein the client device is adapted to display the positive subset of filtered features and the negative subset of filtered features adjacent to portions of the electronic document.

9. The computer-readable medium of claim 8, the operations further comprising:
establishing a training corpus of electronic documents and associated known outcome data describing known outcomes resulting from postings of the electronic documents on the computer network;
extracting a set of training features from contents of the electronic documents in the training corpus; and
generating the one or more machine-learned models by correlating the sets of training features extracted from the contents of the electronic documents in the training corpus and the associated known outcome data.

10. The computer-readable storage medium of claim 8, the operations further comprising:
posting the electronic document on the computer network;
receiving outcome data describing responses to the posting of the electronic document on the computer network with respect to the objective; and
selectively revising the machine-learned models based on the outcome data.

11. The computer-readable storage medium of claim 8, wherein extracting the set of new features from the content of the electronic document comprises:
extracting syntactic factors describing a structure of sentences in the content of the electronic document;
extracting structural factors relating to structure and layout of the content of the electronic document; and
extracting semantic factors relating to meaning of the content in the electronic document.

12. The computer-readable storage medium of claim 8, wherein extracting the set of features from the content of the electronic document comprises:
extracting phrase-related features indicating presence of distinctive phrases in the content of the electronic document, the phrase-related features indicating categories corresponding to the distinctive phrases and the distinctive phrases' levels of association with the corresponding categories.

13. The computer-readable storage medium of claim 8, wherein providing the predicted outcome to the client device comprises:
providing a user interface for display on the client device, the user interface identifying a plurality of distinctive phrases in the content of the electronic document and, for each identified distinctive phrase, indicating an influence of the distinctive phrase on the predicted outcome of the electronic document with respect to the objective.

14. The computer-readable storage medium of claim 8, wherein the electronic document is a recruiting document, the objective relates to demographic information of people responding to the recruiting document, the predicted outcome predicting characteristics of reader responses to the electronic document, and indicating a likelihood that the electronic document will achieve the objective.

15. An analysis server for evaluating an electronic document with respect to an objective, comprising:
a processor for executing computer program instructions; and
a non-transitory computer-readable storage medium storing computer program instructions executable to perform steps comprising:
receiving the electronic document from a client device via a computer network, the electronic document having content directed toward achieving the objective;
extracting a set of features from the content of the electronic document;

evaluating the features in the set using one or more machine-learned models that indicate directions and degrees of correlation between the features extracted from the content of the electronic document and the objective to which the content of the document is directed to predict an outcome of the electronic document with respect to the objective, evaluating the features comprising:
    assigning weights to the features in the set, a weight assigned to a feature indicating a direction and degree of correlation between the feature and the predicted outcome of the electronic document, and combining the weights of the set of features to predict the outcome of the electronic document;
ranking the features in the set according to the directions and degrees of correlation between the features and the predicted outcome of the electronic document, ranking the features comprising:
    identifying a positive set of features having positive weights that indicate a positive correlation between the weights and the predicted outcome, and a negative set of features having negative weights that indicate a negative correlation between the weights and the predicted outcome, and
    ranking features within each of the positive set of features and the negative set of features according to absolute values of the weights associated with the features;
filtering the features in the set based on the rankings of the features in the set to produce a positive subset of filtered features identified to increase a predicted likelihood that the content of the electronic document will achieve the objective and a negative subset of filtered features identified to decrease the predicted likelihood that the content of the electronic document will achieve the objective, filtering the features comprising selecting a subset of the positive set of features as the positive subset of filtered features and another subset of the negative set of features as the negative subset of filtered features based on the rankings in each set; and
providing the predicted outcome and the positive subset of filtered features and the negative subset of filtered features to the client device, wherein the client device is adapted to display the positive subset of filtered features and the negative subset of filtered features adjacent to portions of the electronic document.

* * * * *